United States Patent [19]

Schmucker

[11] 4,138,790

[45] Feb. 13, 1979

[54] COLLAPSIBLE AND TELESCOPING FISHING NET

[76] Inventor: Wayne A. Schmucker, R.R. No. 2, West Unity, Ohio 43570

[21] Appl. No.: 860,885

[22] Filed: Dec. 15, 1977

[51] Int. Cl.² ............................................. A01K 77/00
[52] U.S. Cl. ...................................................... 43/12
[58] Field of Search ...................................... 43/12, 11

[56] References Cited

U.S. PATENT DOCUMENTS

| | | | |
|---|---|---|---|
| 998,318 | 7/1911 | Young | 43/12 |
| 1,490,048 | 4/1924 | Voelker | 43/12 |
| 2,620,585 | 12/1952 | Delcey | 43/12 |
| 2,725,658 | 12/1955 | Wiederhold et al. | 43/12 |
| 3,815,272 | 6/1974 | Marleau | 43/12 |
| 4,050,177 | 9/1977 | Gerritsen | 43/12 |

*Primary Examiner*—Nicholas P. Godici
*Assistant Examiner*—Robert Olszewski
*Attorney, Agent, or Firm*—Oldham, Oldham, Hudak & Weber

[57] ABSTRACT

A collapsible fishing net apparatus having a telescoping and collapsible rim assembly, a collapsible handle assembly, a yoke assembly receiving said rim assembly and said handle assembly and netting attached to said rim assembly.

15 Claims, 9 Drawing Figures

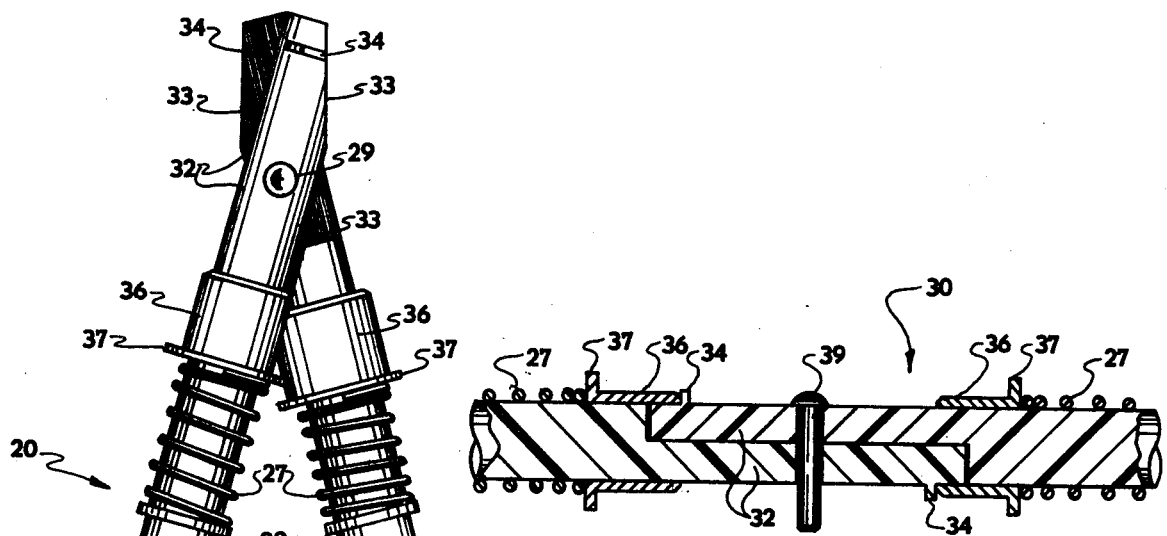
FIG. 5
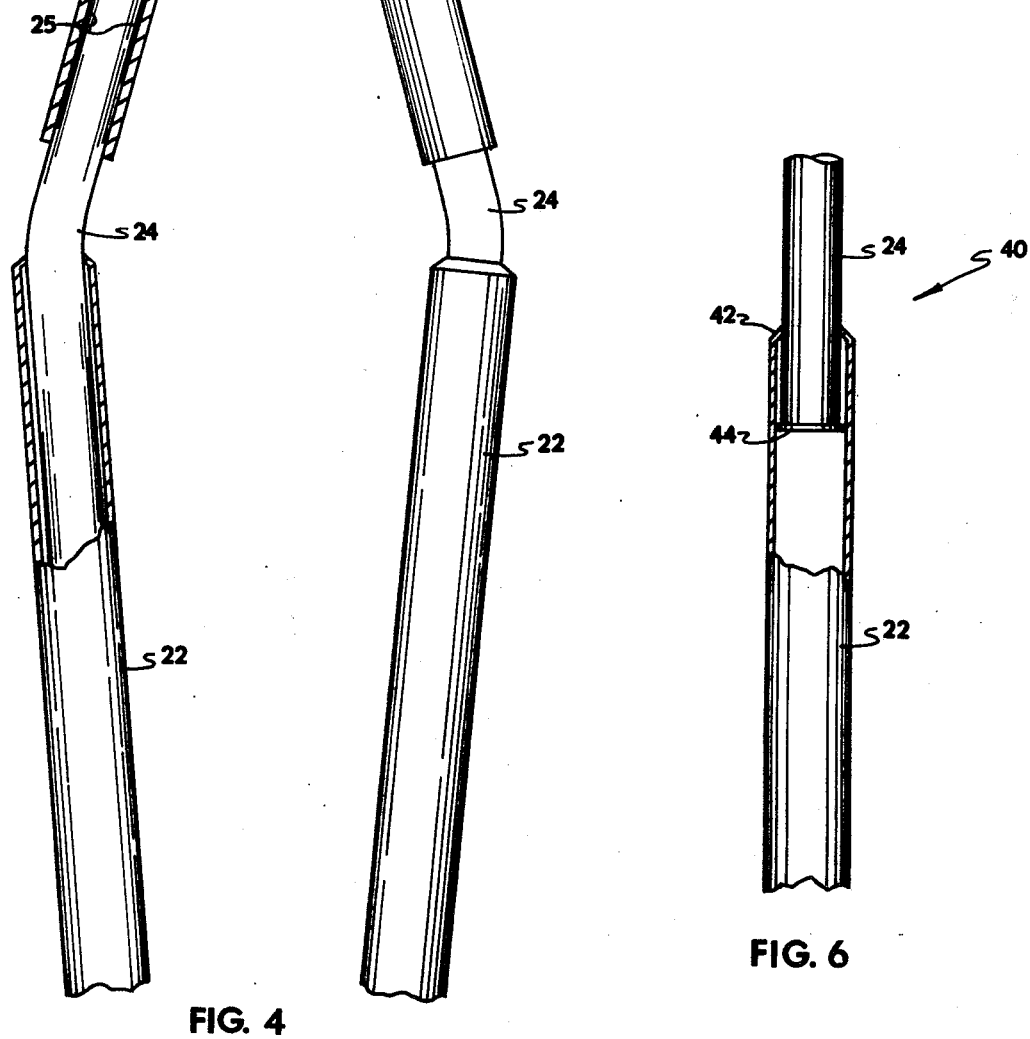
FIG. 4
FIG. 6

COLLAPSIBLE AND TELESCOPING FISHING NET

BACKGROUND OF THE INVENTION

Heretofore, many fishing nets have been disclosed to the public which have collapsible features. In an attempt to reduce the size of the fishing nets used, these nets have utilized a variety of collapsing means. However, while realizing their purposes for collapsibility, such nets have not been structurally sound or economically feasible. Moreover, the ease of assembly has been a particular problem for those nets which must be expanded for use at a moment's notice. Once assembled, these fishing nets do not possess the proper strength at their expansion securement point to withstand the weight placed in the fishing net during operation.

Many different types of collapsible fishing nets have been disclosed to the public. One type of net employs the handle as a canister for storage of the rim and netting. The rim may unfold and become secure by the use of a series of hinges, as in U.S. Pat. No. 3,340,874; or the rim may unfold using a series of three tubes, two of which are hinged together, and the second sliding along the third tube to its outermost point, such as disclosed in U.S. Pat. No. 3,815,272. Another type of fishing net is disclosed by U.S. Pat. No. 2,727,328, wherein the rim is stored in two pieces and connected once it is deployed from the handle.

Also utilizing the concept of assembling the rims at the base of the handle are U.S. Pat. Nos. 2,471,273 and 3,579,890. In the former, the net disclosed also employs the use of a metal collar which slides over the two portions of the rim which are pivoted at a point farthest from the base of the handle. In the latter, the rim serves as one piece and is merely attached to the base of the handle, the essence of the invention being the spring-loaded handle extension apparatus.

Yet another type of fishing net is disclosed by U.S. Pat. No. 2,683,321. In this disclosure, the rim is hinged at two points; the base of the handle, and the point farthest from the base of the handle. This rim is collapsible in half longitudinally rather than laterally.

The final type of collapsible fishing net is disclosed by U.S. Pat. Nos. 270,641; 407,709; and 1,490,048. In the first, the rim is laterally compressed along the length of the outer circumference of the handle; and, as the rim slides along the length of the handle to its full extension, the rim is secured at the base of the handle. The second disclosure of this type of fishing net utilizes a similar embodiment of the same general principal, but employs a different type of securing device at the base of the handle for the strength of the rim to be upheld during a landing operation. In the third embodiment of this type, it is the handle rather than the rim which moves to expand the rim to prepare for a landing operation. The handle is released from the far edge of the rim and the rim takes its natural shape, also employing the use of a telescoping portion of the rim. However, this embodiment does not employ any rim structural feature in connection with the handle to maintain structural strength and tension during a landing operation.

Because each of these types of fishing net embodiments have inherent within their structure, disadvantages of either case of assembly, tensile strength, compressibility, or the like; they are readily distinquished from the present application.

SUMMARY OF THE INVENTION

The present invention relates to the collapsible and telescoping fishing net.

More specifically, the present invention relates to a collapsible and telescoping fishing net which occupies very little space when collapsed, is readily and quickly assembled to an operational condition, and which is capable of landing large fish.

Consequently, it is an object of the instant invention to provide a collapsible and telescoping fishing net wherein the entire fishing net expansion operation provides ease of assembly, a function of its simplified construction.

It is another object of the invention to provide a collapsible and telescoping fishing net wherein said fishing net is capable of resisting the tension created during a successful landing operation.

It is a further object of the invention to provide a collapsible and telescoping fishing net wherein the fishing net apparatus is collapsible to one third of its extended length.

It is an additional object of the invention to present a collapsible and telescoping fishing net wherein the said apparatus compresses to less than one fifth of its extended width.

It is yet another object of the invention to provide a collapsible and telescoping fishing net wherein the rim remains entirely connected during storage to provide for greater ease of assembly.

It is yet a further object of the invention to provide a collapsible and telescoping fishing net wherein only one hinge apparatus is employed on the rim to prevent multiple tension points.

It is yet an additional object of the invention to provide a collapsible and telescoping fishing net wherein part of said rim extends from other portions of the rim to create a telescoping effect.

It is still another object of the invention to provide a collapsible and telescoping fishing net wherein a junction between the rim assembly and the handle assembly employs a minimum of parts and a maximum of resistance to tension.

It is still a further object of the invention to provide a collapsible and telescoping fishing net wherein said rim assembly employs the use of a double hinge at its only hinge point in order to maintain structural strength at the point of its greatest tension during a landing operation.

These objects and other objects will become apparent from the detailed description.

In general, a fishing net apparatus, comprises:
a telescoping and collapsing rim assembly, netting, a collapsible handle assembly, and a yoke assembly;
said rim assembly having two hollow shafts and two arcuate members, each said arcuate member telescoping in one of said hollow shafts, each said arcuate member attached to a spring latching means for securing said rim assembly in an operational position;
said two spring latching means attached together with a free rotational pivoting means for assembly of said fishing net into said operational position;
said netting strung on said rim assembly;
said handle assembly having a spring release means for maintaining said handle assembly in said operational position;

said yoke assembly having a hollow central shaft through which said handle assembly may collapse;

said yoke assembly having wing means for engaging said rim assembly shafts, and pivot pins;

said wing means having apertures through which said pivot pins secure said rim assembly to said yoke assembly; and said central shaft having an aperture through which said spring release means secures said handle assembly to said yoke assembly in said operational position.

Generally, a fishing net rim apparatus, comprises:

a telescoping and collapsible rim assembly, netting, and a yoke assembly;

said telescoping and collapsible rim assembly having rigid shaft members from which flexible arcuate members telescope;

said arcuate members secured together by a latching apparatus;

said latching apparatus having double-spring capping means for securing the operational position of said rim assembly in an open position;

said double-spring capping turning about a rotational pivoting means for conversion from a closed position to said open position;

said netting strung on said rim assembly;

said yoke assembly having free rotational pivot pin and wing means for horizontally supporting said rim assembly during operation;

said wing means having apertures through which said free rotational pivot pins engage said rigid cylindrical members; and said rigid cylindrical members having beveled surface means for proper stable contact between said rim assembly and said yoke assembly in said operational position.

DESCRIPTION OF THE DRAWINGS

For a complete understanding of the objects, techniques, and structure of the invention, reference is made to the following detailed description of the accompanying drawings, wherein:

FIG. 4 is a top plan and exploded view of both the collapsed and telescoped rim assembly;

FIG. 5 is a cross-sectional view of the double-hinge assembly;

FIG. 6 is a cut-away view of the housing cylinder junction with the rim assembly arcuate member;

DETAILED DESCRIPTION OF THE PREFERRED EMBODIMENT

Figures 1, 2:
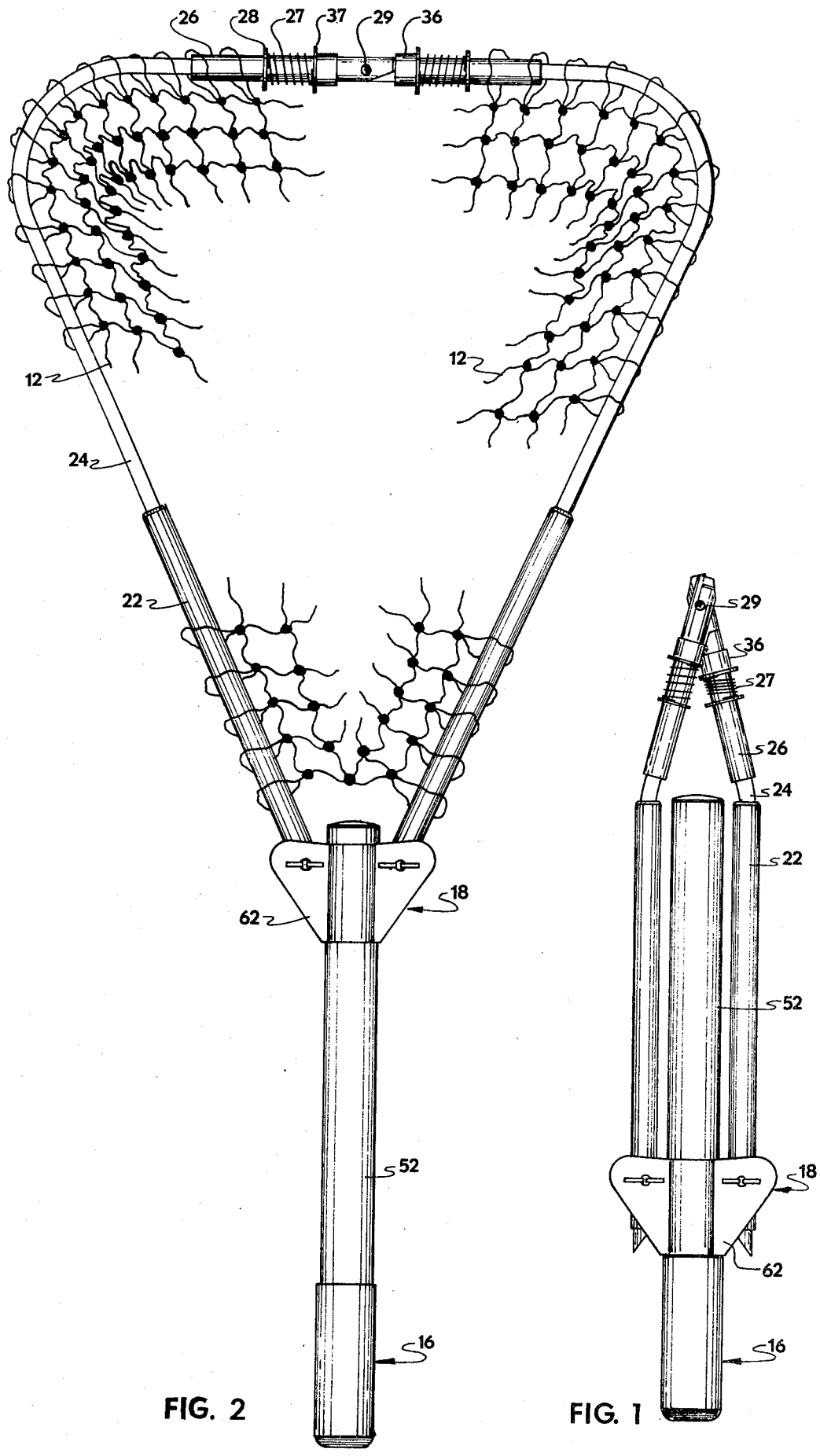
FIG. 1 is a top plan view of a collapsible and telescoping fishing net, according to the present invention, in a collapsed position.
FIG. 2 is a top plan view of the collapsible and telescoping fishing net in a telescoped or fully expanded position.

Referring now to the drawings, and more particularly to FIGS. 1 and 2, an understanding of the structure of the invention may be achieved. The collapsible and telescoping fishing net, generally indicated by the numeral 10, is composed of a mesh netting 12, a rim assembly referred to generally by the numeral 14, the handle assembly generally referred to by the numeral 16, and a yoke assembly referred to generally by the numeral 18. When assembled in its extended form (FIG. 2) for a landing operation, the landing net 10, generally has a polygonal shape, such as a triangle, from which the mesh netting 12 hangs. The area of the rim assembly within the triangular shape may be varied according to the requirements of a particular landing or netting operation, but it is most likely that the telescoping portions of the rim assembly 14 will be extended to their greatest length.

When not assembled, the rim assembly, as collapsed and telescoped and generally referred to by the numeral 20, may be best seen by an examination of FIG. 4. The collapsed and telescoped rim assembly 20 is composed of two rigid housing cylinders 22, two flexible telescoping arcuate members 24, two tensile sleeves 26, two tensile springs 27, and two tensile spring tension caps 36, joined at pivot point 29 by a pivotal pin 39. The flexible telescoping arcuate members 24 may be housed in the rigid housing cylinder 22 during storage, telescoping almost to the point where the tensile sleeves 26 meet the rigid housing cylinder 22. During expansion, the arcuate members 24 must be flexible in order to permit the angle at the pivot point 29 between the two tensile sleeves 26 to reach approximately 180 degrees. Once the hinging operation is completed, the arcuate members 24 must maintain their strength while bent during a landing operation. Because of the need for its flexible, but sturdy properties, the arcuate members typically are composed of a high resilient plastic or elastomer, such as nylon or a semi-hard rubber. The rigid housing cylinder 22, to the contrary, may be composed of a lightweight but sturdy material which typically may be a material such as aluminum or a hard thermal setting plastic. The tensile sleeves 26 need not be as flexible as the arcuate members 24, but it is preferable to have them made from a plastic material such as nylon.

The junction between the arcuate member and the tensile sleeve, referred to generally by the numeral 25, must be made of a bonding material which is capable of permanently joining two types of materials which have been discussed hereinabove with regard to the arcuate members 24 and the tensile sleeves 26. On the tensile sleeve 26 is a tensile spring brace 28 which prevents the expansion of the tensile spring 27. Likewise, there is a flanged spring brace 37 located on spring tension cap 36 to prevent the tensile spring 27 from expanding in the opposite direction.

The expansion and assembly of the rim assembly 20 is begun by telescoping out the arcuate members 24 from the rigid housing cylinder 22. The arcuate members 24 may not extend beyond the compressed cylinder end 42 because of the arcuate member restraint flange 44 located at the junction between the housing cylinder and the arcuate member, generally referred to by the numeral 40, as best seen in FIG. 6. Once telescoping is completed, the flexible telescoping arcuate members 24 are bent to achieve a 180 degree angle between the tensile sleeves 26. While in this degree of declination, the tensile spring tension caps 36 are held back to permit the tensile sleeves 26 to pivot at pivotal point 29, rotating around pivot pin 39. Once the 180 degree position has been achieved, the tension caps 36 spring back into position, upon release by the operator, thus sliding over the ends of the other respective tensile sleeve 26. At the end of tensile sleeve 26 is a spring tension tab 34 to prevent the tensile spring tension cap 36 from extending beyond the point at which the tension tensile spring 27 is relaxed completely.

Figure 3:
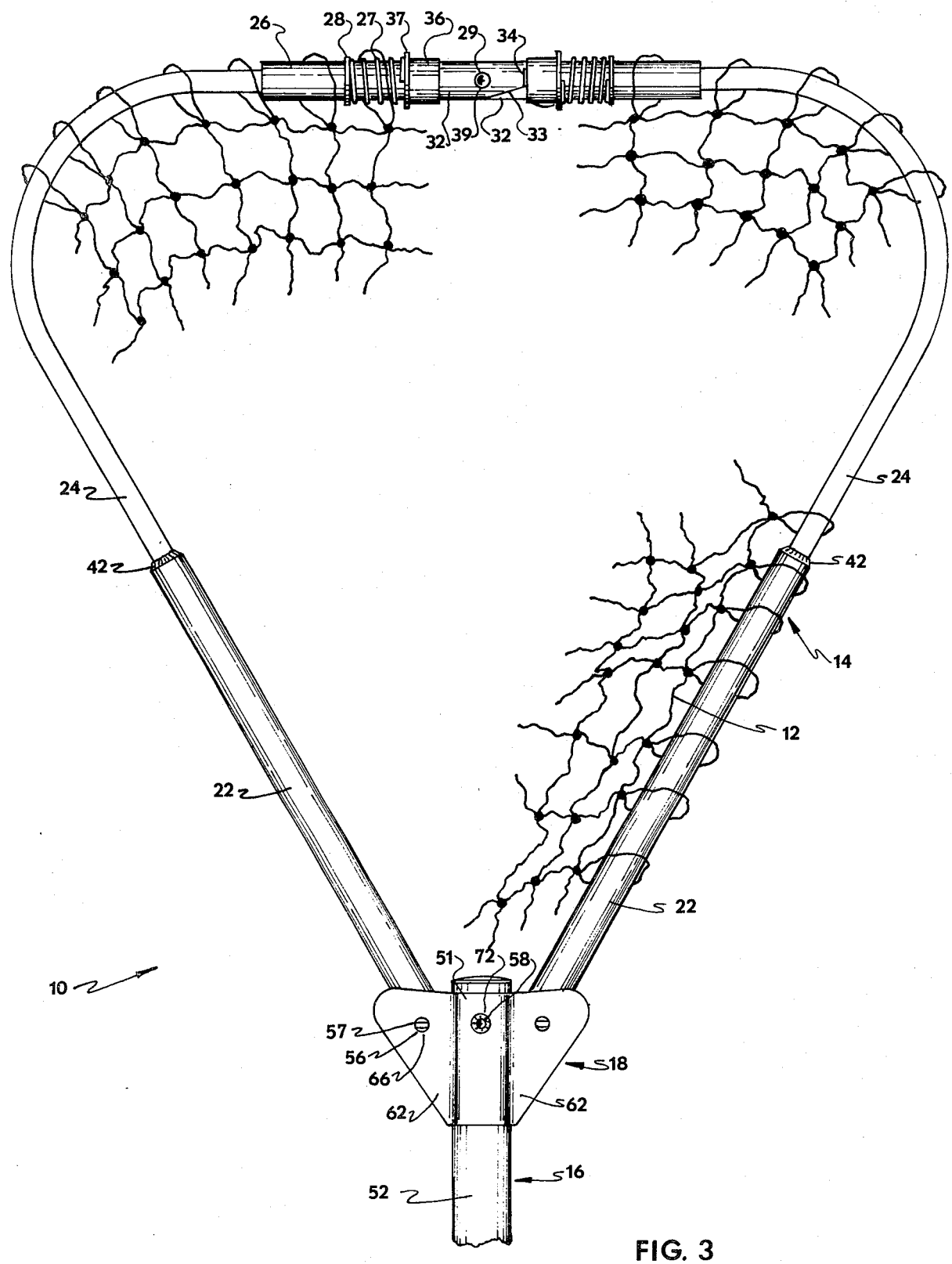
FIG. 3 is a partial top plan view of the collapsible and telescoping fishing net assembly as extended in preparation for a landing operation.

This double-hinge assembly 30 may be best seen by the cross-sectional view as afforded by FIG. 5. The tensile sleeves 26 have hemi-cylindrical end portions 32, in order to permit a consistent diameter throughout the rim assembly and to provide greater structural strength to the double-hinge assembly 30 upon the return of the tensile spring tension cap 36 to its completed operational position. The hemi-cylindrical end portions 32 have beveled surfaces 33 at the proper points, as seen by a re-examination of FIG. 3 of the top plan of this area. Beveled surfaces 33 must necessarily be at the end portions 32 to provide for maximum movement during assembly, and a beveled surface 33 is necessary along one tensile sleeve 26 to permit greater collapsibility of the rim assembly 20 during storage.

Referring again to FIG. 5, it is important to remember that the tensile spring tension cap 36 is restrained from being completely along the hemi-cylindrical end portions 32 by the spring tension tabs 34. Because the tensile spring 27 has not been fully released, there is sufficient potential energy remaining within the double-hinge assembly 30 to provide sufficient tensile strength during a landing operation. Further, the double-hinge assembly 30 is the only point along the entire rim assembly 14 which receives significant strain during assembly, and the flexibility of arcuate members 24 prevents the object within the mesh netting from further straining the rim assembly 14 during a landing operation. This represents a significant improvement over existing fishing nets in that placement of the rim assembly hinge 30 is located at a point on the rim and injected to a minimum of strain during a landing operation, because arcuate members 24 are composed of flexible material. Additionally, the need for a double-hinge assembly 30 is apparent upon examination of existing fishing nets having a single-hinge assembly, because the single-hinge assembly is subject to torsional strain inherent in a landing operation which might lead to unintentional collapse of the rim assembly and the entire fishing net.

Figure 7:
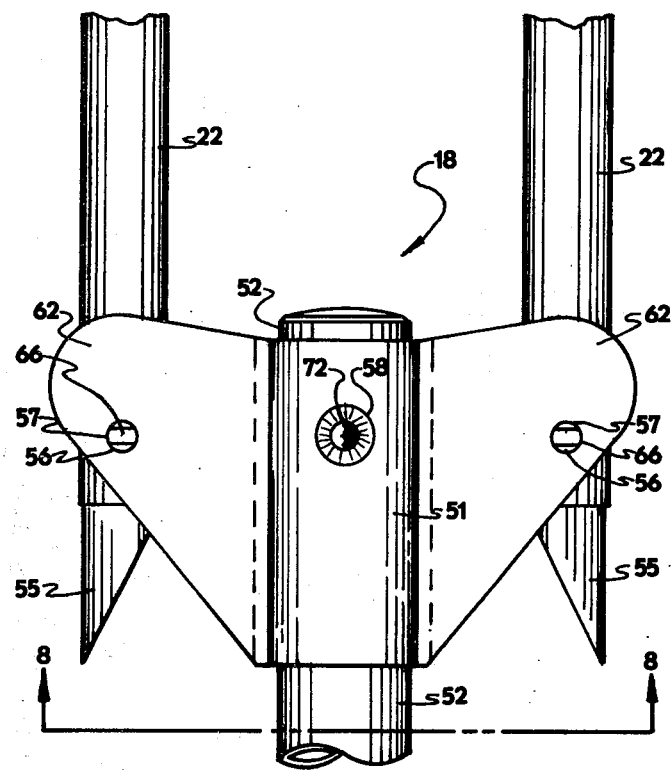
FIG. 7 is a top plan view of the rim handle yoke assembly.
Figure 8:
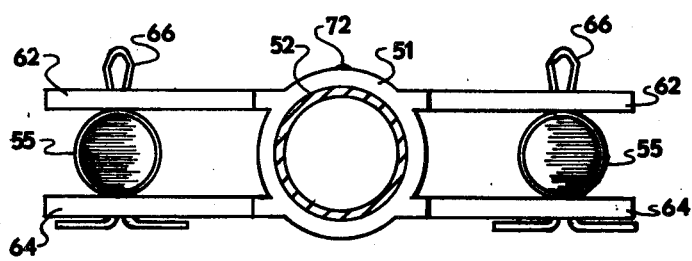
FIG. 8 is a front plan view of the rim handle yoke assembly.

The assembly of the rim assembly 14, in the securement of the rim assembly 14 by the use of the double-hinge assembly 30, requires the use of a specialized, but greatly simplified, yoke or rim handle junction 18. Referring now to FIG. 7, a greater understanding of the rim handle yoke assembly 18 may be achieved. The yoke assembly 18 is composed of a tensile yoke cylinder 51, two upper yoke wings 62, two lower yoke wings 64, two rotational pivot pin aperatures 57, and a collapsible handle restraint aperture 58. At the end portion of each rigid housing cylinder 22 is a beveled tensile cylinder extension 55 which permits the rotation of the rigid housing cylinder 22 at rotational pivot points 56 to a point where the beveled cylinder extension 55 braces itself against the interior portion of the tensile yoke cylinder 51. The use of the upper yoke wings 62 and the lower yoke wings 64 provides excellent structural strength and stability to the rim handle junction 18 during assembly and during a landing operation. Holding the rigid housing cylinders 22 to the upper and lower wings 62,64 of the rim handle yoke assembly 18, are pivot pins 66 which may be of the cotter-type.

These pivot pins restrain the cylinders 22 in their proper positions but provide free rotation of the rigid housing cylinders 22 to a point where the beveled tensile cylinder extensions 55 rest upon the interior portion of the tensile yoke cylinder 51.

Within the interior of the tensile yoke cylinder 51, the rigid cylindrical handle 52 of the fishing net may slide, further increasing the collapsibility of the fishing net 10. The rigid cylindrical handle may be made of any lightweight, sturdy material capable of supporting the weight of the entire fishing net plus the catch. On the upper portion of the tensile yoke cylinder 51 is a collapsible handle restraint aperture 58 through which the tension spring release knob 72 extends. To collapse the handle into the fishing net after a landing operation, the tension spring release knob 72 is depressed by the operator. Once depressed, the rigid cylindrical handle 52 may be pushed towards the rim assembly 14 as it has already been collapsed and telescoped, referred to generally by the numeral 20. With the rim assembly 14 collapsed and telescoped and the handle assembly collapsed, the entire fishing net 10 is reduced to one third of its length and, generally, less than one fifth of its width.

Figure 9:
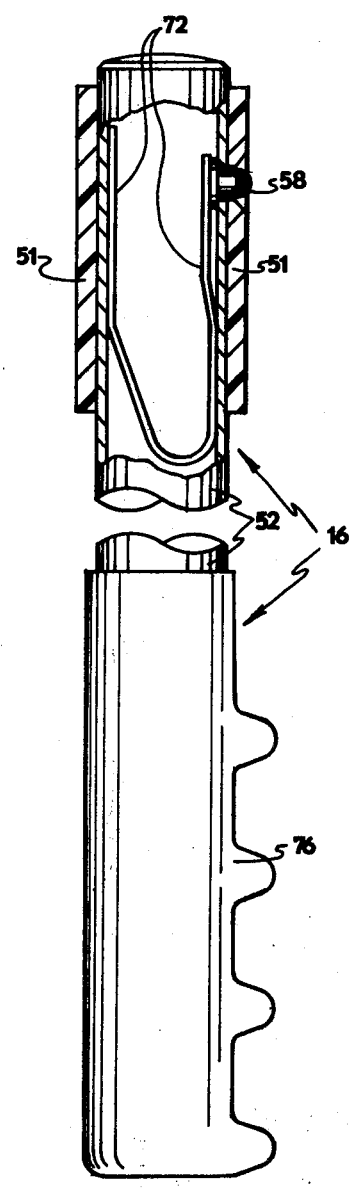
FIG. 9 is a top plan and cut-away view of the handle assembly.

Referring to FIG. 9, a cross-sectional and top plan view of the handle assembly 16, an understanding of the tension spring release knob 72 may be achieved. As shown by the cross-section, the tension spring release knob 72 extends through the collapsible handle restraint aperture 58 of the tensile yoke cylinder 51. Also within FIG. 9 is a view of the end portion of the rigid cylindrical handle 52 showing a typical handle and hand grip 76, as known to those skilled in the art for comfortable use by the operator during a landing operation.

It should now be readily apparent that a structure has been presented whereby a fishing net may be collapsed and telescoped to one third of its length and less than one fifth of its width; but, when assembled, the fishing net has superior structural strength and resistance to tension along both the rim assembly and the junction between the handle and rim assembly.

While in accordance with the patent statutes, only the best mode and preferred embodiment of the invention has been presented and described in detail, it is to be understood that the invention is not limited thereto or thereby. Consequently, for an appreciation of the true scope and breadth of the invention, reference should be had to the following claims.

What is claimed is:

1. A fishing net apparatus, comprising:
 a telescoping and collapsing rim assembly, netting, a collapsible handle assembly, and a yoke assembly;
 said rim assembly having two hollow shafts and two arcuate members, each said arcuate member telescoping in one of said hollow shafts, each said arcuate member attached to a spring latching means for securing said rim assembly in an operational position;
 said two spring latching means attached together with a free rotational pivoting means for assembling said fishing net into said operational position;
 said netting strung on said rim assembly;
 said handle assembly having a spring release means for maintaining said handle assembly in said operational position;
 said yoke assembly having a hollow central shaft through which said handle assembly may collapse;
 said yoke assembly having wing means for engaging said rim assembly shafts, and pivot pins;

said wing means having apertures through which said pivot pins secure said rim assembly to said yoke assembly; and said central shaft having an aperture through which said spring release means secures said handle assembly to said yoke assembly in said operational position.

2. A fishing net apparatus as recited in claim 1, wherein said rim assembly shaft has a compressed end portion and said arcuate members have a restraint flange means so that the amount of telescoping extension is limited.

3. A fishing net apparatus as recited in claim 1, wherein said arcuate members are made from a flexible material capable of resisting torsional and tensional stress and strain.

4. A fishing net apparatus as recited in claim 1, wherein said handle assembly and said rim assembly hollow shafts are made from a rigid material.

5. A fishing net apparatus as recited in claim 1, wherein said latching means has a hinge sleeve, a spriral spring, two spring braces, a spring tension cap, and a tension tab;

each said hinging sleeve having a hollow end portion into which said flexible arcuate member is received and secured;

each said spring restrained on each end by said spring braces, one of each said spring located on said hinging sleeve and said tension cap;

each said hinging sleeve having a hemi-cylindrical end portion, said hemi-cylindrical end portion of one said hinging sleeve mating with said hemi-cylindrical end portion of the other said hinging sleeve;

said hinging sleeves connected midway along the length of each said end portion by said free rotational pivoting means for assembly of said rim assembly into said operational position;

said spring prevented from complete relaxation by said spring tension cap being restrained in said operational position by said tension tab located on said end portion between said pivoting means and said terminal point of said end portion; and the inside of said hemi-cylindrical end portion having an unencumbering beveled surface at said terminal point.

6. A fishing net apparatus as recited in claim 5, wherein said free rotational pivoting means comprises a pivot pin.

7. A fishing net rim apparatus, comprising:
a telescoping and collapsible rim assembly, netting, and a yoke assembly;

said telescoping and collapsible rim assembly having rigid shaft members from which flexible arcuate members telescope;

said arcuate members secured together by a latching apparatus;

said latching apparatus having double-spring capping means for securing the operational position of said rim assembly in an open position;

said double-spring capping means turning about a rotational pivoting means for conversion from a closed position to said open position;

said netting strung on said rim assembly;

said yoke assembly having free rotational pivot pin and wing means for horizontally supporting said rim assembly during operation;

said wing means having apertures through which said free rotational pivot pins engage said rigid cylindrical members; and said rigid cylindrical members having beveled surface means for proper stable contact between said rim assembly and said yoke assembly in said operational position.

8. A fishing net rim apparatus as recited in claim 7, wherein said rigid shaft members have a compressed end portion and said flexible arcuate members have a restraint flange means so that the amount of telescoping extension is limited.

9. A fishing net rim apparatus as recited in claim 7, wherein said double-spring capping means has two hinging sleeves, spiral springs, spring tension caps, spring braces, and tension tabs;

each said hinging sleeve having a hollow end portion into which said flexible arcuate member is received and secured;

each said spring restrained on each end by said spring braces, one of each said spring brace located on said hinging sleeve and said tension cap;

each said hinging sleeve having a hemi-cylindrical end portion, said hemi-cylindrical end portion of one of said hinging sleeves mating with said hemi-cylindrical end portion of the other said hinging sleeve;

said hinging sleeves connected midway along the length of each said end portion by said free rotational pivoting means for assembly of said rim assembly from said storage position into said operational position;

said spring prevented from complete relaxation by said spring tension cap being restrained in said operational position by said tension tab located on said end portion between said pivoting means and the terminal point of said end portion; and the inside of said hemi-cylindrical end portions having unencumbering beveled surfaces at said terminal points.

10. A fishing net rim apparatus as recited in claim 9, wherein said hinging sleeves are made from tensile material having horizontal and rotational structural stability.

11. A fishing net rim apparatus as recited in claim 10, wherein said hinging sleeves are attached to said flexible arcuate members with bonding material.

12. A fishing net rim apparatus as recited in claim 9, wherein said free rotational pivoting means is a pivot pin.

13. A fishing net rim apparatus according to claim 9, including a handle assembly.

14. A fishing net rim apparatus according to claim 13, wherein said handle assembly is collapsible.

15. A fishing net rim apparatus according to claim 14, wherein said handle assembly has a spring release for maintaining said handle in an extended or a collapsed position.

* * * * *